(12) United States Patent
Soleil

(10) Patent No.: US 9,653,908 B2
(45) Date of Patent: May 16, 2017

(54) DEVICE FOR LIMITING DISTURBANCES OF AN ELECTRICAL NATURE

(71) Applicant: HAGER-ELECTRO SAS, Obernai (FR)

(72) Inventor: Daniel Soleil, Senas (FR)

(73) Assignee: HAGER-ELECTRO SAS, Obernai (FR)

( * ) Notice: Subject to any disclaimer, the term of this patent is extended or adjusted under 35 U.S.C. 154(b) by 84 days.

(21) Appl. No.: 14/647,469

(22) PCT Filed: Nov. 26, 2013

(86) PCT No.: PCT/FR2013/052858
§ 371 (c)(1),
(2) Date: May 27, 2015

(87) PCT Pub. No.: WO2014/083271
PCT Pub. Date: Jun. 5, 2014

(65) Prior Publication Data
US 2015/0311693 A1    Oct. 29, 2015

(30) Foreign Application Priority Data
Nov. 27, 2012  (FR) ..................................... 12 61265

(51) Int. Cl.
| | | |
|---|---|---|
| *H02H 3/20* | (2006.01) | |
| *H02H 3/22* | (2006.01) | |
| *H02H 1/04* | (2006.01) | |
| *H02H 9/00* | (2006.01) | |
| *H02H 7/20* | (2006.01) | |

(52) U.S. Cl.
CPC ................ *H02H 3/20* (2013.01); *H02H 1/04* (2013.01); *H02H 3/22* (2013.01); *H02H 7/20* (2013.01); *H02H 9/005* (2013.01)

(58) Field of Classification Search
CPC .. H02H 3/20; H02H 3/22; H02H 1/04; H02H 9/005
USPC ....................................................... 361/91.1
See application file for complete search history.

(56) References Cited

U.S. PATENT DOCUMENTS

| | | | | |
|---|---|---|---|---|
| 5,510,945 A | * | 4/1996 | Taylor ..................... | H02H 3/33 361/18 |
| 6,542,345 B1 | | 4/2003 | Bauer | |
| 7,999,633 B2 | * | 8/2011 | Xu ....................... | H03H 1/0007 333/177 |

(Continued)

OTHER PUBLICATIONS

International Search Report issued in corresponding application No. PCT/FR2013/052858 on Feb. 24, 2014.

*Primary Examiner* — Scott Bauer
(74) *Attorney, Agent, or Firm* — Carter, DeLuca, Farrell & Schmidt, LLP

(57) ABSTRACT

A device for limiting disturbances of an electrical nature, such as currents induced by overvoltages caused by these disturbances, in particular electromagnetic, for example relating to events of lightning type in an electrical installation, including at least one protection apparatus of isolator or differential breaker type intended to protect at least one downstream electrical installation having at least one load and being powered between a neutral conductor and at least one phase conductor and including an earth link. A common-mode low-pass filter is connected in parallel between the neutral and each phase on one hand, and earth on the other hand.

21 Claims, 2 Drawing Sheets

(56) References Cited

U.S. PATENT DOCUMENTS

Figure 1:
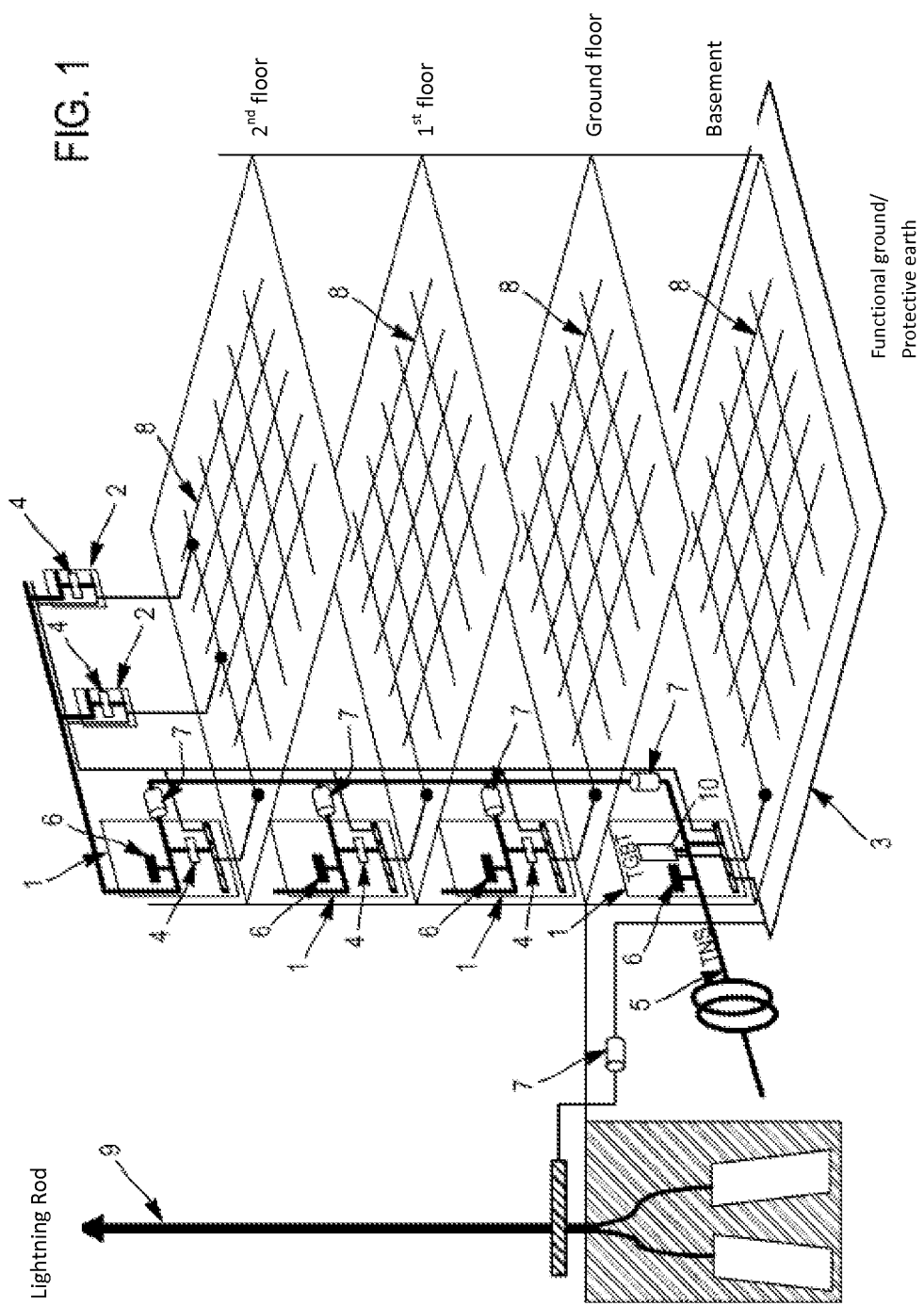

| | | | |
|---|---|---|---|
| 2002/0125854 A1* | 9/2002 | Williamson | H02M 1/10 318/727 |
| 2003/0127913 A1* | 7/2003 | Roberts, Jr. | G06F 1/266 307/89 |
| 2006/0043920 A1* | 3/2006 | Baker | H02M 1/126 318/611 |
| 2006/0232134 A1* | 10/2006 | Kirkorian | G06F 1/189 307/38 |
| 2007/0127177 A1 | 6/2007 | Benton et al. | |

* cited by examiner

DEVICE FOR LIMITING DISTURBANCES OF AN ELECTRICAL NATURE

This invention involves a device for limiting disturbances or disruptions of an electrical nature such as parasitic currents induced by overvoltages/surges caused by natural electromagnetic or abovementioned phenomena with which our present environment is "polluted" all the time. In natural phenomena, the most immediate and the best known is lightning which may cause considerable overvoltages which in turn generate variable potential differences, which are detected during the propagation of the wave created after the impact of the lightning strike such as on the ground for instance. Among the abovementioned phenomena, proliferation of electrical and electronic devices with multiple purposes also generates signals which are not necessarily controlled and are even less functionally useful for operating equipment.

Limiting devices of the invention are among other called upon to be incorporated in electrical installations that comprise at least a load, in other words, a device or equipment, or else, at least one limited installation, and supplied by the common electrical network, with this common feed of components or parts of the installation being in itself a cause for their possible "pollution" by disturbances since they are all linked by said network. Many of these installations comprise protective means of the electrical lines, namely by means of the circuit breaker type or differential switch type device aimed at protecting at least a downstream circuit. The feed by the network generally implies the existence of a neutral conductor and at least a phase conductor, with a ground link also being provided so that the system is complete from a safety point of view.

In other words, the device of the invention involves any electrical installation fed through the electrical network since it is acknowledged that disturbances, electromagnetic or other, appear inevitably on such a network, disturbances that may degrade the performance of the connected devices. Its purpose is to improve the electromagnetic compatibility (EMC) at several levels of an entire system by making the installation capable of operating better in its electromagnetic environment, without producing itself disruptive electromagnetic disturbances for whatever is present in this environment.

The areas to protect or immunize are of all types, including houses, apartments, offices, public places in general. For certain assumptions, the immunization organized by this invention is associated with a functional necessity, for instance in certain laboratories, in physiology rooms, etc.

The disturbances express themselves for instance in the form of currents stemming from overvoltages, but the constant increase of the electronic devices that marks our present times is analyzed in practice by an increase of the number of capacitances connected directly to ground, which accentuates the parasitic current phenomena. These disturbances can also appear in the form of additional currents to the supply current, for instance currents induced by a switch-mode power supply that may propagate from an electrical installation to another (common mode current). In addition, any High Frequency (HF) electrical field variation to which a conductor is submitted generates an induced electrical current, irrespective of the existence of an overvoltage.

The example already used of the lightning strike is emblematic, since it creates as indicated a voltage variation that is detectable during the propagation of the lightning wave through the ground, and that it creates at the terminals of these parasitic capacitances leakage currents, for instance between neutral and ground.

The purpose of the invention is to limit outside disruptive currents from entering the installation, to ensure as best as possible the equipotential nature of the reference conductors. The originality of this invention is to work with the impedance (reference plan) and with filtering to limit the HF currents for the purpose of respecting the equation applied to the ohm law $U=Z*I=O$ at the building level. This permits to insulate the installation from the outside and thus avoid to have uncontrolled (floating) potentials that may lead to device failures tied to the electrical network of the installation.

To examine further the technical context and the action mechanisms of the disturbances, it must be pointed out that the propagation of an overvoltage can take place according to two different modes, the common mode (already mentioned) and the differential mode, whether it is transmitted between all active conductors or the neutral and the ground, or it appears between the different active conductors of the same line or cable, in other words, in this case, between phases or between phase and neutral. In the first case, the induced currents flow in the same direction, while in the second case, they flow in the opposite way, consequently, in opposition of phase.

All these disruptions, whether caused by current or voltage, may create problems, such as, since they can cause disruptive tripping of differential products, and more in general, because they negatively affect proper operation of the connected equipment and systems. Consequently, it is important to look into the causes and to find devices that enable limiting the effects.

As such, high frequency (HF) currents (in the common mode) that can appear during the supply of active components of the circuit by the power distribution network, may generate HF noise which, if it is of the same level as the one that for instance is required for the logic equipment command (high level), may negatively affect the operation of logic gates, without the users or the system being able to check them, and cause an erratic operation of the equipment involved.

Such HF signals may for instance be produced either internally, by different types of standard devices (ripple feed, switch mode power supply, etc. . . . ) or result from an external capture (antenna effects . . . .).

The consequences of the appearance of these signals in circuits are numerous and are increasing constantly, such as due to the always greater proliferation of electronic equipment in daily life, which upsets "the electromagnetic environment" of the electrical installations. The latter is clearly more and more "polluted" by the proliferation of signals of any kind, which induces in turn and in a vicious circle the generation of new disruptive signals.

If today, there are limiting devices present on certain isolated equipment (televisions, computers, . . . ) nothing has really been done until now on the scale of overall installations, at a time when they are nevertheless called upon to communicate and transmit an increasing number of data, at the risk of increasing the problems by transmitting measuring errors, bad data or bad decisions, or by causing false activations, or else by generating breakdowns or incidents (unexpected startup of a machine, for instance) of equipment.

To remediate these flaws, reduce the level of disruptions as much as possible, and at the same time make the installations less sensitive to any disruption, for instance at high frequency, the device for limiting disturbances or disruptions in an electrical installation of the invention, is characterized mainly by the fact that it includes a common mode low-pass filter connected in parallel between the neutral and each phase on the one hand, and the ground on the other hand.

The idea is to create a short-circuit between the phases or the neutral and ground for high frequency, for grounding the HF currents. If such a filter which can be qualified as hardening filter, is absent, any cause of electromagnetic pollution between these conductors and the ground will generate HF currents that transit through the installation and may disrupt the load, in other words, the various devices that make up said installation.

In fact, such a filter permits transforming any neutral point treatment into a high frequency TNS type neutral point treatment, which is identified as being the best to avoid unexpected activations of the differential products, because they permit avoiding too large a potential difference between the neutral and the protective conductor (ground).

In fact, this TNS neutral point treatment permits separating the neutral and phase conductors to conserve the equipotential nature of ground and neutral for high frequency.

In addition, the limiting device of the invention may include at least a differential mode low-pass filter connected between each phase and the neutral.

Such a filter permits filtering the low frequency disruptions (at least 50 Hz) originating directly from the supply source and smoothing out the overvoltages and the voltage dips. Preferably, each differential mode low-pass filter is connected to a distribution node going to downstream circuits or in the vicinity of sensitive equipment constituting loads.

In addition, to increase the high frequency impedance, and as such to limit the corresponding currents in the installation, the device according to the invention can include at least a common mode inductance connected in series to each lead. In practice, there may be two, respectively located at each end of the cable.

The presence of one or two common mode inductances on a cable has the effect of creating an HF pseudo-isolation between the ends. This configuration is recommended in the ground circuit link between two circuits for which any contamination by electrical interference is to be avoided. The most frequent examples are related to the lightning effects and to those of wiring associated with an inverter.

According to the invention, the common mode inductance may include a closed magnetic circuit surrounding at least one conductor. It may be provided with at least one air gap for reasons of installation in existing facilities.

In the common mode, mitigation of the interference in a subdivision power distribution such as a circuit tied to an apartment takes place by placing a common mode inductance at each end. The increase of the HF inductance in the supply line by such an inductance located at each end enables to increase the efficiency of the common mode low-pass filter for the circuit used. The same is true for three-phase and single-phase.

Except for a special configuration, one of the consequences is that, the IT neutral arrangement (single-phase or three-phase) does not need any common mode inductance for the power distribution.

Before, the fact was mentioned that the limiting device of the invention applies to entire installations. As such, it is preferably installed upstream of the electrical facility devices to provide protection, for instance, at the power distribution panels and/or immediately downstream of the power supplier's meter.

Preferably still, it includes a ground plane or meshed network connected to ground. An important technical objective, extensively stressed above, includes facilitating the connection to ground.

An important object of the device of the invention is in fact to perform filtering, such as to permit the high frequency signals to be ran to ground before entering the installation, filters must be provided having an impedance that diminishes according to the frequency. Ideally, this impedance should be nearly zero for high frequency, to achieve a HF short-circuit, and considerable for low frequency, typically at the power network frequency (50 Hz).

As such, the filters used for the device of the invention, namely common mode low-pass filters as well as differential mode low-pass filters, include essentially capacitances that permit the specific filtering mentioned before.

In fact, the differential mode filter is required because of the technology for manufacturing capacitors used which induces an interference inductance in each capacitor that limits the value of the high frequency capacitance. Consequently, by positioning two capacitors with different values in parallel between a phase lead and the neutral (one belonging to the common mode filter and the other to the differential mode filter), each capacitor operates (filters the signal) in its usage frequency band which is linked to its manufacturing technology. This filtering consequently permits diminishing the equivalent impedance of the power source.

More specifically, according to the invention, the ratio of the capacitance values of the differential mode low-pass filter and of the common mode low-pass filter falls between 10 and 500, and is preferably 100. However, one must limit the reactive power due to the capacitances at 8% maximum of the total output of the downstream installation and preferably at 5% of the total output.

It must be pointed out that in the invention, the differential mode filter, when used in a three-phase network with neutral, is star-wired. This permits performing HF short-circuits between the phases as well as between phases and neutral, and this limits the wiring inductance.

In addition, according to a possibility specific to the invention, the capacitances used for the differential mode low-pass filter are class X1 or X2. Using class X1 capacitances is preferred to withstand 4.5 kV overvoltages; using class X2 capacitances is preferred to withstand 2.5 kV overvoltages.

The fact of using the devices of the invention when entering the installation often implies in practice placing them not only at the level of, but more particularly in electrical boxes or panels that run the installations. Consequently, such a device can for instance be housed in a main panel for a building or in distribution boxes or panels located downstream and that govern more limited installations limited to apartments for instance.

In all cases, one remains upstream of distribution and protective devices which make up the upstream part of the circuit, before the loads. Preferably, according to the invention and to facilitate the incorporation into distribution cabinets, at least the common mode low-pass filter may be placed in a modular device box, secured to a standard rail of at least one power distribution box installed upstream of a circuit or in a set of circuits to be protected.

Secondly, within the framework of the invention, one might provide a lightning arrester connected between the neutral and each phase on the one hand and the ground on the other hand, between the common mode inductance and the common mode low-pass filter. Such a lightning arrester is added to the other components mentioned before to increase the overall efficiency of the system for limiting disruptions according to the invention.

It must be noted that the common mode low-pass filters that have been mentioned may include at least an active frequency notch module in a 3 kHz to 143 kHz frequency band. The objective is to let pass possible power line carrier currents used to transmit information across supply lines of the Installation. Using at least one frequency notch module acting in the 20 kHz to 143 kHz band permits passage of domotic type carrier currents. In certain cases, it may be beneficial using at least a notch module rejecting the 20 kHz to 70 kHz frequency band, which permits preventing resonances due to the presence of power transformers on the power line, so as to stabilize the network. These notches may be positioned at the low-pass filter level or in series on the neutral and phase conductors.

Then, the ground planes, for which it has been mentioned that they are also likely to increase the efficiency of the invention device, may be incorporated into the structure of a building where the installation is located. As such, each ground plane may consist of rebars of a concrete apron, connected at a minimum of two locations by a braid with a cross-section of at least 50 mm$^2$ to the ground of a distribution box.

Other electrical conductors exist indeed in an installation (such as rebars for instance) for which potentials are totally floating (because they are not referenced at the power sources) and consequently, they may be responsible for the proliferation of certain disruptions. Nevertheless they can be used as ground planes and as such they have a major role in the EMC of buildings, because they represent what is called electromagnetic counterweights, inert grounds at the electrical level which will serve as first reference for all distribution trees and sensitive equipment.

The electromagnetic counterweight is essential for referencing the distributed source, by its direct and short connection to the common mode low-pass filters. The ground connection is generally long and it only ensures the safety of individuals and property. This counterweight requires surface or volume in the environment. A simple, economical and performing solution is provided by the rebars with metal braid ascents up to the level of the electrical distribution cabinets.

If absent, they can be made up or remade with copper straps of a few tenths of a millimeter thick, 5 cm wide and a mesh of 50 cm.

They must be interconnected in the same way as the concrete aprons by at least 2 points in redundancy and made available by braid ascents for instance to the busbars of the ground potentials of the cabinets, etc. or of any device that is useful for handling power and distribution.

Alternatively, the ground planes may also be made up of the metal frames of the cabinets or the power distribution boxes.

Always considering an improvement of the entire system for limiting disturbances or disruptions, one might foresee that a common mode inductance is connected in series to the cable linking a lightning rod and the ground.

The device of the invention as shown above consequently performs functional steps that can be implemented with several combinations that provide great flexibility of usage to the extent that said device can be adapted by the prescriber or professional for each specific environment.

Figure 2:
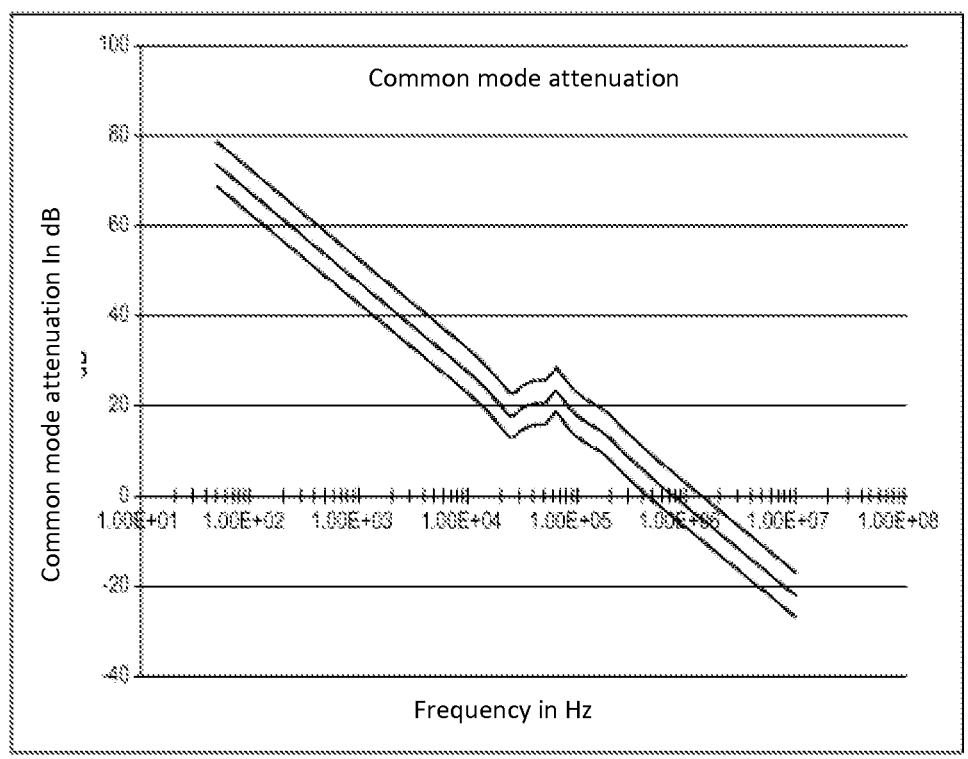

Now, the invention will be explained while making reference to the annexed figures or illustrations, for which:

FIG. 1 shows the incorporation of the invention in an electrical installation having the form of a building with several floors; and FIG. 2 shows a common mode low-pass filter mitigation diagram.

With respect to FIG. 1, each floor is provided with a divisional electrical panel (1) that supplies, as applicable, terminal distribution panels (2) which for instance, are located upstream of electrical installations ascribed to apartments. Each of these panels (1, 2) is supplied by the power network (5), in this case, shown at the lower left of the building.

All of the buildings are in addition linked to a grounding conductor (3) to which all panels (1, 2) are connected.

According to the invention, each panel (1, 2) includes a common mode low-pass filter (4) connected between the supply lines (5) (phases, neutral) and the grounding conductor (3). Said filter is essentially made up of capacitances.

In addition, a differential mode low-pass filter (6) also made up of capacitances but for which the values are as mentioned before, different from those of the common mode filter, is connected between each phase and the neutral of the supply lines (5).

In addition, a common mode inductance (7) is connected in series to each line, upstream of the installations, in other words, in this case upstream of the division panels (1), just at the outlet of the main panel (1') located on the basement level.

It must be noted that on each floor, rebars incorporated in the ground are used as ground plane (8) forming electromagnetic counterweights for which it has been pointed out that they are essential for referencing the distributed source, because their connections to the common mode low-pass filters (4) is more direct and short that the connection of the latter with the grounding conductor (3) that represents in practice the functional ground.

It must be pointed out that in the representation of FIG. 1, the installation is provided with a lightning rod also connected to the functional ground (3) through a common mode inductance (7).

The main division panel (1') located downstream of the incoming mains supply (5) also includes a lightning arrester (10).

The diagram of FIG. 2 clearly illustrates the feature of the common mode filtering that is implemented according to this invention. This is indeed a low-pass filter, with the high frequencies, such as above megahertz, being eliminated for the reasons given above.

The diagram also shows that the filter includes a frequency notch module for a band that is significantly limited between 20 kHz and 70 kHz.

The invention claimed is:

1. A device for limiting disturbances or disruptions of an electrical nature, comprising:
    at least one breaker type or differential switch type protective device configured to protect a downstream electrical circuit having a load and being supplied by a neutral conductor, a phase conductor, and a grounding link;
    a common mode low-pass filter connected in parallel between the neutral conductor and each of the phase conductor on the one hand and the grounding link on the other hand; and a ground plane or grid network connected to a ground, wherein the ground plane is incorporated into a structure of a building where the device is located.

2. The device according to claim 1, further comprising a differential mode low-pass filter connected between the phase conductor and the neutral conductor.

3. The device according to claim 2, wherein each differential mode low-pass filter is connected to a distribution node towards the downstream electrical circuit or in the vicinity of sensitive equipment constituting loads.

4. The device according to claim 1, further comprising a common mode inductance connected in series to each of the phase conductor and the grounding link.

5. The device according to claim 4, wherein the common mode inductance is made up of a closed magnetic circuit surrounding a conductor, and provided with an air gap.

6. The device according to claim 1, wherein the device is installed upstream of an electric circuit to be protected.

7. The device according to claim 2, wherein the common mode low-pass filter or the differential mode low-pass filter includes capacitances.

8. The device according to claim 7, wherein the reactive power of the capacitances is limited to a maximum to 8% of a total power of the downstream electrical circuit.

9. The device according to claim 7, wherein a ratio of the capacitances at the differential mode low-pass filter and of the common mode low-pass filter is between 10 and 500.

10. The device according to claim 7, wherein the capacitances used for the differential mode low-pass filter are of an X1 or X2 class.

11. The device according to claim 1, wherein at least the common mode low-pass filter is located in a modular device box, secured to a standard rail of at least an electrical distribution box installed in an upstream circuit or of a set of circuits to be protected.

12. The device according to claim 4, further comprising a lightning arrester connected between the neutral conductor and each of the phase conductor on the one hand and the ground on the other hand, between the common mode inductance and the common mode low-pass filter.

13. The device according to claim 1, wherein the common mode low-pass filter comprises at least an active frequency notch module in the 3 kHz to 143 kHz frequency band.

14. The device according to claim 13, wherein the active frequency notch module rejects a 20 kHz to 70 kHz frequency band.

15. The device according to claim 13, wherein the active frequency notch module rejects a 20 kHz to 143 kHz frequency band.

16. The device according to claim 1, wherein the ground plane is made up of rebars of an apron, connected at two locations at least by a braid with a cross-section of at least 50 $mm^2$ to a ground of a distribution box.

17. The device according to claim 1, wherein the device is made up of copper strips of a few tenths of a millimeter thick, 5 cm wide and of a 50 cm mesh, connected at two locations by a braid with a cross-section of at least 50 $mm^2$ to a ground of a distribution box.

18. The device according to claim 1, wherein the ground plane is made up of a least one of a metal frame of a cabinet or an electrical distribution box.

19. The device according to claim 2, wherein the differential mode filter, when used in a three-phase network with the neutral conductor, is star-wired.

20. The device according to claim 1, wherein the disturbances or disruptions include currents induced by overvoltages caused by electromagnetic disturbances or disruptions tied to lightning events.

21. A device for limiting disturbances or disruptions of an electrical nature, comprising:

at least one breaker type or differential switch type protective device configured to protect a downstream electrical circuit having a load and being supplied by a neutral conductor, a phase conductor, and a grounding link; and a common mode low-pass filter connected in parallel between the neutral conductor and each of the phase conductor on the one hand and the grounding link on the other hand, wherein a common mode inductance is connected in series to a cable connecting a lightning rod and the ground.

* * * * *